US010094614B2

(12) United States Patent
Xu

(10) Patent No.: US 10,094,614 B2
(45) Date of Patent: Oct. 9, 2018

(54) METHOD FOR DEWATERING ACOUSTICAL PANELS

(71) Applicant: USG INTERIORS, LLC, Chicago, IL (US)

(72) Inventor: Yufeng Xu, Gurnee, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 15/379,347

(22) Filed: Dec. 14, 2016

(65) Prior Publication Data
US 2018/0164035 A1 Jun. 14, 2018

(51) Int. Cl.
F26B 7/00 (2006.01)
F26B 3/04 (2006.01)
F26B 5/12 (2006.01)
F26B 5/14 (2006.01)
F26B 9/04 (2006.01)

(52) U.S. Cl.
CPC ............... F26B 7/00 (2013.01); F26B 3/04 (2013.01); F26B 5/12 (2013.01); F26B 5/14 (2013.01); F26B 9/04 (2013.01)

(58) Field of Classification Search
CPC ...... F26B 7/00; F26B 3/04; F26B 5/12; F26B 5/14; F26B 9/04; G03C 1/49872; G03C 2001/7628; C08K 13/06; C08K 3/00
USPC .................. 34/398, 92; 430/619; 524/436
See application file for complete search history.

(56) References Cited

U.S. PATENT DOCUMENTS

| 1,769,519 | A | | 7/1930 | King et al. |
| 2,020,403 | A | | 11/1935 | Engle |
| 3,246,063 | A | | 4/1966 | Podgurski |
| 3,307,651 | A | | 3/1967 | Podgurski |
| 3,426,063 | A | | 2/1969 | Gros |
| 3,445,257 | A | | 5/1969 | Hloch |
| 3,802,386 | A | | 4/1974 | Wendlandt et al. |
| 3,930,876 | A | | 1/1976 | Nakajima et al. |
| 4,288,252 | A | | 9/1981 | Neely |
| 4,328,019 | A | | 5/1982 | Dejaiffe et al. |
| 4,366,251 | A | * | 12/1982 | Rapp ...................... C03C 13/00 501/36 |
| 4,541,854 | A | | 9/1985 | Schonhaar et al. |
| 4,720,295 | A | | 1/1988 | Bronshtein |
| 4,818,595 | A | | 4/1989 | Ellis |
| 4,822,388 | A | * | 4/1989 | Gee ........................ C03B 5/12 44/566 |
| 4,911,788 | A | | 3/1990 | Pittman et al. |
| RE33,773 | E | | 12/1991 | Guerro et al. |
| 5,250,153 | A | | 10/1993 | Izard et al. |
| 5,332,699 | A | | 7/1994 | Olds et al. |
| 5,472,917 | A | | 12/1995 | Talling et al. |
| 5,496,392 | A | | 3/1996 | Sims et al. |
| 5,558,710 | A | * | 9/1996 | Baig ........................... 106/780 |
| 5,614,449 | A | | 3/1997 | Jensen |
| 5,709,728 | A | | 1/1998 | Fleckenstein et al. |
| 5,750,255 | A | | 5/1998 | Yoshida et al. |
| 5,776,392 | A | | 7/1998 | Schmuck |
| 5,911,818 | A | | 6/1999 | Baig |
| 5,932,500 | A | * | 8/1999 | Jensen ..................... C03C 13/00 501/36 |
| 5,956,860 | A | * | 9/1999 | Leiner ..................... D21H 25/18 34/202 |
| 5,974,691 | A | * | 11/1999 | Marchal ................... D21F 5/20 34/122 |
| 6,077,798 | A | | 6/2000 | Rapp |
| 6,171,388 | B1 | | 1/2001 | Jobbins |
| 6,265,335 | B1 | | 7/2001 | Oleske et al. |
| 6,305,495 | B1 | | 10/2001 | Keegan |
| 6,346,494 | B1 | * | 2/2002 | Jensen ..................... C03C 13/00 501/35 |
| 6,428,616 | B1 | | 8/2002 | Neely, Jr. |
| 6,443,258 | B1 | | 9/2002 | Putt et al. |
| 6,613,424 | B1 | | 9/2003 | Putt et al. |
| 6,893,752 | B2 | | 5/2005 | Veeramasuneni et al. |
| 6,897,173 | B2 | | 5/2005 | Bernard et al. |
| 6,919,132 | B2 | | 7/2005 | Felegi, Jr. et al. |
| 7,056,460 | B2 | | 6/2006 | Englert |
| 7,179,585 | B2 | * | 2/2007 | Okutsu ............... G03C 1/49881 396/575 |
| 7,201,572 | B2 | * | 4/2007 | Wood ..................... C04B 35/565 264/109 |
| 7,296,441 | B2 | * | 11/2007 | Leister ..................... C03B 1/02 65/134.1 |
| 7,364,015 | B2 | | 4/2008 | Englert et al. |
| 7,851,052 | B2 | | 12/2010 | Caldwell |
| 8,044,130 | B2 | * | 10/2011 | Miyamoto ............... C08K 9/04 252/610 |
| 8,133,357 | B2 | | 3/2012 | Cao et al. |
| 8,196,312 | B2 | * | 6/2012 | Taguchi ................ B41C 1/1083 118/65 |
| 8,202,581 | B2 | * | 6/2012 | Vetter ..................... C04B 28/02 427/402 |
| 8,536,259 | B2 | | 9/2013 | Carbo et al. |
| 8,603,231 | B2 | | 12/2013 | Wagh et al. |
| 8,697,588 | B2 | * | 4/2014 | Brown ..................... C03B 37/06 501/27 |

(Continued)

FOREIGN PATENT DOCUMENTS

CA 2139368 C * 6/2005 .......... C04B 18/021
CN 103145342 A 6/2013

(Continued)

OTHER PUBLICATIONS

"Bonding and Coating Applications of PQ® Soluble Silicates" brochure, Industrial Chemicals Division, PQ Corporation, 7 pp. (2006).

(Continued)

Primary Examiner — Stephen M Gravini
(74) Attorney, Agent, or Firm — Marshall, Gerstein & Borun LLP

(57) ABSTRACT

The disclosure provides a method of forming an acoustical panel base mat, including providing a green board including an alkyl ether sulfate surfactant, wherein the green board includes from about 10 to about 40 wt. % solids, and dewatering the green board slurry to form a dewatered green board, wherein the dewatering comprises supplying hot air and applying a vacuum to the green board.

18 Claims, No Drawings

(56) References Cited

U.S. PATENT DOCUMENTS

| | | | |
|---|---|---|---|
| 8,756,825 B2* | 6/2014 | Priebe | F26B 3/22 |
| | | | 118/239 |
| 8,904,668 B2* | 12/2014 | Priebe | F26B 3/22 |
| | | | 101/450.1 |
| 8,967,823 B2 | 3/2015 | D'Antonio | |
| 9,073,780 B2 | 7/2015 | Schinkinger et al. | |
| 9,076,428 B2 | 7/2015 | Kipp et al. | |
| 9,096,079 B2* | 8/2015 | Priebe | B41J 11/002 |
| 9,133,064 B2* | 9/2015 | Killilea | C04B 41/009 |
| 9,194,627 B2* | 11/2015 | Daley | F26B 5/12 |
| 9,328,211 B2* | 5/2016 | Nemoto | C08B 15/04 |
| 9,382,153 B2 | 7/2016 | Fisher et al. | |
| 9,410,058 B2* | 8/2016 | Blackburn | C09D 183/04 |
| 9,796,635 B1* | 10/2017 | Luan | C04B 35/803 |
| 2004/0039098 A1 | 2/2004 | Belmares et al. | |
| 2005/0281999 A1* | 12/2005 | Hofmann | B32B 5/18 |
| | | | 428/304.4 |
| 2006/0057512 A1* | 3/2006 | Yamamoto | G03C 1/49854 |
| | | | 430/619 |
| 2007/0055012 A1 | 3/2007 | Caldwell | |
| 2007/0277948 A1 | 12/2007 | Carbo et al. | |
| 2011/0262721 A1 | 10/2011 | Albertelli et al. | |
| 2013/0334726 A1 | 12/2013 | Hernandez-Torres et al. | |
| 2016/0032583 A1 | 2/2016 | Xu et al. | |
| 2017/0107152 A1* | 4/2017 | Xu | C04B 28/145 |

FOREIGN PATENT DOCUMENTS

| | | | | |
|---|---|---|---|---|
| EP | 0194371 A1 | 9/1986 | | |
| WO | WO-88/05100 A1 | 7/1988 | | |
| WO | WO 9605149 A1 * | 2/1996 | | C04B 18/021 |
| WO | WO 2006086736 A2 * | 8/2006 | | D21H 21/16 |
| WO | WO-2009/067300 A1 | 5/2009 | | |
| WO | WO-2010/114626 A1 | 10/2010 | | |

OTHER PUBLICATIONS

"Sodium and Potassium Silicates: Versatile Compounds for Your Applications" brochure, PQ Europe, 16 pp. (Oct. 2004).

"Soluble Silicates in Geotechnical Grouting Applications", Bulletin 52-53, Industrial Chemicals Division, PQ Corporation, 6 pp. (2003).

McDonald et al., Recent Developments in Soluble Silicate Based Binders and Coatings, 10 pp.

McDonald et al., Sodium Silicate a Binder for the 21st Century, Industrial Chemicals Division, The PQ Corporation, 6 pp.

Rabbii, Sodium silicate glass as an inorganic binder in foundry industry, Iranian Polymer J., 10(4):229-35 (2001).

PCT International Search Report with Written Opinion in corresponding Int'l appln. PCT/US2017/066033, dated Mar. 13, 2018.

* cited by examiner

METHOD FOR DEWATERING ACOUSTICAL PANELS

FIELD OF THE INVENTION

The disclosure relates generally to a process for dewatering green board. More particularly, the disclosure relates to a process for dewatering green board including the combined use a surfactant with hot air and a vacuum.

BACKGROUND

Fibrous panels, such as the base mats for traditional ceiling tiles and acoustical panels, are typically made using a wet forming process. The components that will make up the fibrous panel are first mixed in water to form a dispersion and then flowed onto a moving support wire screen, such as that of a Fourdrinier machine to form green board. The green board is then dewatered, first by gravity and then vacuum suction means, and subsequently dried in a heated convection drying oven to form the lightweight base mat of an acoustical panel. Drying in the heated convection drying oven typically is the production limiting step, as well as the most costly production step.

SUMMARY

One aspect of the disclosure provides a method of forming an acoustical panel base mat, including providing a green board including an alkyl ether sulfate surfactant, wherein the green board includes from about 10 to about 40 wt. % solids, and dewatering the green board to form a dewatered green board, wherein the dewatering comprises supplying hot air and applying a vacuum to the green board.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the disclosure to the specific embodiments described herein.

DETAILED DESCRIPTION

The disclosure provides a method of forming an acoustical panel base mat, including providing a green board including an alkyl ether sulfate surfactant, wherein the green board includes from about 10 to about 40 wt. % solids, and dewatering the green board slurry to form a dewatered green board, wherein the dewatering comprises supplying hot air and applying a vacuum to the green board.

Advantageously, when dewatering of green board includes the combined use an alkyl ether sulfate surfactant as disclosed herein with both hot air and a vacuum, the resulting dewatered green board and/or dried base mat provide one or more advantages including reduced water content in the green board after dewatering, thereby reducing the time and cost of drying the green board to form a base mat that demonstrates similar, if not improved, strength relative to an equivalent base mat formed from green board that does not include a surfactant and has been dewatered according to conventional industry processes.

As used herein, "green board" refers to the composition slurry at the outset of and through the gravity dewatering step, and until the composition is dried to form the final base mat. Accordingly, as used herein "dewatered green board" refers to the green board after vacuum dewatering and prior to oven drying and "base mat" refers to the dried composition after oven drying.

"Equivalent base mat" or "equivalent green board" when used herein includes a modifier, e.g., "with no surfactant added", "with no surfactant of the disclosure added", and/or "dewatered according to conventional industry processes." As used herein "equivalent base mat" or "equivalent green board" means that the composition of a green board and/or base mat is the same as a second green board and/or base mat, to which the first is being compared, and/or the process of preparing the green board and/or base mat is the same as a second green board and/or base mat, with the exception of the noted modified condition, typically, the modified condition being no surfactant is included in the comparative equivalent base mat and/or equivalent green board and/or no alkyl ether sulfate included in the comparative equivalent base mat and/or equivalent green board and/or no hot air is applied during dewatering of the comparative equivalent green board.

As used herein, the terms panel and tile should be considered interchangeable.

In embodiments, the green board further comprises a mineral wool, a cellulose, a mineral aggregate, and a starch. In embodiments, the hot air applied during dewatering has a temperature in a range of about 250° F. (about 120° C.) to about 500° F. (about 260° C.). In embodiments, the dewatering achieves a reduction in water of at least about 5%, compared to an equivalent base mat formed by dewatering a green board under equivalent conditions with no surfactant included and/or no alkyl ether sulfate included.

In embodiments, the method further includes a drying step to form a dried base mat. Optionally, the dewatered green board is dried at a temperature of about 300° F. (about 204° C.) to about 600° F. (about 316° C.). In embodiments, the dried base mat demonstrates a reduction in modulus of rupture (MOR) values of no greater than about 10%, compared to an equivalent base mat with no surfactant included, as determined by ASTM C367, described below. Without intending to be bound by theory, it was believed that when a surfactant is included in a green board slurry in an amount sufficient to significantly improve the efficiency of the dewatering of the green board, the strength of the final base mat, as characterized by MOR values, dramatically decreases. Advantageously, a synergistic relationship between the alkyl ether sulfate surfactant of the disclosure and the application of hot air during the vacuum dewatering step was found, such that the use of hot air greatly increased the efficiency of the surfactant in the dewatering process, allowing the surfactant to be used in an amount small enough that the base mats formed from dewatering green boards in accordance with the disclosure do not demonstrate significant decreases in MOR values (e.g., the reduction in MOR value is no greater than 10%) and in some cases demonstrate improved MOR values relative to an equivalent base mat with no surfactant included.

Optionally, the green board is substantially free of an inorganic acid. Optionally, the green board is substantially free of a resin latex. As used herein, "substantially free of an inorganic acid" and "substantially free of a resin latex" means that the green board composition does not contain significant amounts of inorganic acid or resin latex. Thus, incidental or background quantity of inorganic acid or resin latex (e.g., less than 0.5 wt. % based on the total solids content) may be present in the coating compositions according to the disclosure and be within the scope of the disclosure.

Green Board Composition

In general, the green board of the disclosure comprises water, a mineral wool, a mineral aggregate, a cellulose, a binder, and a surfactant.

The mineral wool may be any of the conventional mineral fibers prepared by attenuating a molten stream of basalt, slag, granite, or other vitreous mineral constituent. Expressed in terms of percent by weight of the total dry solids content of the final panel product, the mineral wool constituent may be present in an amount in a range of about 10% to about 60%, about 10% to about 50%, about 12% to about 40%, about 12% to about 30%, about 15% to about 25%, about 17% to about 23%, or about 18% to about 22%, for example, about 10%, about 15%, about 20%, about 25%, about 30%, about 35%, about 40%, about 45%, about 50%, about 55%, or about 60%.

The mineral aggregate may be a light-weight inorganic aggregate of exfoliated or expanded glass origin, including, but not limited to expanded perlite, vermiculite, expanded vermiculite, clay, exfoliated clay, and pumice, or the mineral aggregate may be a higher density mineral aggregate, including, but not limited to, stucco (calcium sulfate hemihydrate), gypsum, and limestone. In embodiments, the mineral aggregate is selected from the group consisting of expanded perlite, vermiculite, clay, pumice, stucco, gypsum, limestone, and combinations there In embodiments, the mineral aggregate is selected from the group consisting of expanded perlite, vermiculite, clay, pumice and combinations thereof. In embodiments, the mineral aggregate comprises expanded perlite. In embodiments, the mineral aggregate is substantially free of gypsum.

Expressed in terms of percent by weight of the total dry solids content of the final panel product, the mineral aggregate may be present in an amount in a range of about 35% to about 85%, about 40% to about 80%, about 45% to about 75%, about 50% to about 70%, about 55% to about 65%, about 55% to about 61%, or about 55% to about 60%, for example, about 35%, about 40%, about 45%, about 50%, about 55%, about 56%, about 57%, about 58%, about 59%, about 60%, about 65%, about 70%, about 75%, about 80%, or about 85%.

Cellulosic fibers, an example of an organic fiber, act as structural elements of the final base mat. Cellulosic fibers are typically provided in the form of recycled newsprint. Over Issued Newspaper (OIN) and Old Magazine (OMG) may be used in addition to or as an alternative to newsprint. Expressed in terms of percent by weight of the total dry solids content of the final panel product, the cellulose may be present in an amount in a range of about 5% to about 30%, about 5% to about 25%, about 10% to about 20%, about 10% to about 15%, about 11% to about 27%, or about 12% to about 16%, for example, about 5%, about 10%, about 12%, about 14%, about 16%, about 18%, about 20%, about 25% or about 30%.

The binder may include starch, latex, and reconstituted paper products. Organic binders, such as starch, are often the primary component providing structural adhesion of the resulting panel. Starch is a preferred organic binder because, among other reasons, it is relatively inexpensive. Typical starches include unmodified starches, including, but not limited to, unmodified corn starch. In embodiments, the binder is substantially free of latex.

Expressed in terms of percent by weight of the total dry solids content of the final panel product, the binder may be present in an amount in a range of about 0.5% to about 20%, about 1% to about 16%, about 2% to about 14%, about 4% to about 12%, about 5% to about 11%, about 5% to about 15%, about 6% to about 10%, or about 7% to about 9%, for example, about 0.5%, about 1%, about 2%, about 4%, about 6%, about 7%, about 8%, about 9%, about 10%, about 12%, about 16%, or about 20%.

The surfactant may include an alkyl ether sulfate surfactant, such as Hyonic® 25 AS from GEO Specialty Chemicals, a combination of the capryleth sulfate and capreth sulfate ammonium salts. Alkyl ether sulfate surfactants are salts of ethoxylated alkyl sulfates, containing polyethylene glycol units in their structures. Suitable alkyl ether sulfate surfactants include, but are not limited to, C6 to C26-alkyl ether sulfates, C6 to C20-alkyl ether sulfates, C6 to C16-alkyl ether sulfate, or C6 to C12-alkyl ether sulfates. Examples of suitable alkyl ether sulfate salts include, but are not limited to, laureth sulfate (i.e., lauryl ether sulfate), capryleth sulfate, capreth sulfate, pareth sulfate, myreth sulfate, drideceth sulfate, and combinations thereof. In embodiments, the alkyl ether sulfate is selected from capryleth sulfate ammonium salt, capreth sulfate ammonium salt, and combinations thereof. The alkyl ether sulfate salt may include any suitable counter cation, including but not limited to, sodium, potassium, lithium, and ammonium. In embodiments, the alkyl ether sulfate surfactant is the sodium salt. In embodiments, the alkyl ether sulfate surfactant is the ammonium salt. Expressed in terms of percent by weight of the total solids content of the final panel product, the surfactant may be provided to the green board slurry in an amount in a range of about 0.10% to about 3.00%, about 0.15% to about 2.50%, about 0.20% to about 2.0%, or about 0.1% to about 0.5%, for a neat or 100% active surfactant solution. If the surfactant is provided as a diluted solution, e.g., 30% active content, one of ordinary skill in the art will readily recognize that the amount of surfactant solution included should be adjusted such that the active surfactant is added in the aforementioned ranges. One of ordinary skill in the art will appreciate that the amount of surfactant present in the final dry base mat will be less than initial amount provided to the green board slurry as the surfactant will be removed with the water during dewatering, for example, up to 50%, up to 75%, up to 80%, up to 90%, or greater than 90% of the surfactant will be removed during dewatering. The surfactant removed during dewatering may be collected and reused.

Surprisingly, it was found that when an alkyl ether sulfate surfactant was provided in the green board composition in an amount described above and hot air was applied during dewatering, a dried base mat prepared from the green board composition demonstrated similar, if not improved, strength relative to equivalent base mats formed from green board to which no surfactant was added, according to conventional industry processes, or base mats formed from green board to which surfactant other than an alkyl ether sulfate surfactant was added. Typically, surfactants are not included in a green board composition as the surfactant is expected to decrease the strength of the resulting dried base mat, characterized by MOR values. The dried base mats formed from the green board composition of the disclosure are considered to have acceptable strength similar to base mats prepared using conventional green board compositions and base mat preparation methods according to conventional industry processes, if the dried base mats demonstrate a reduction in the MOR value no greater than 10% of the MOR value of an equivalent base mat formed from green board to which no surfactant was added, according to industry standards.

When preparing the green board slurry, the order of adding the mineral wool, cellulose, mineral aggregate, binder, and surfactant is not particularly limiting. In embodiments, the mineral wool, cellulose, mineral aggregate and binder will be mixed with water and the surfactant added and mixed to achieve homogenous distribution immediately prior to dewatering. In embodiments, prior to vacuum dewatering, the green board comprises about 10 wt % to about 45 wt % solids, about 10% to about 30%, about 15 wt % to about 35 wt % solids, or about 15 wt % to about 25 wt % solids.

In embodiments, the green board of the disclosure comprises about 15% to about 25% mineral wool, about 10% to about 15% cellulose, about 50% to about 70% mineral aggregate, about 6% to about 10% binder, and about 0.1% to about 0.5% surfactant, based on the total weight of the solids. In embodiments, the green board comprises mineral wool, the cellulose is provided by recycled newspaper fiber, the mineral aggregate comprises expanded perlite, the binder comprises unmodified corn starch, and the surfactant comprises an alkyl ether sulfate surfactant.

Dewatering

Acoustical panels can be prepared using the green board composition of the disclosure according to, for example, a wet felted production process. One version of this process is described in U.S. Pat. No. 5,911,818, herein incorporated by reference in its entirety. In general, an aqueous slurry including a dilute aqueous dispersion of the green board composition is delivered onto a moving foraminous wire of a Fourdrinier-type mat forming machine. The green board slurry is initially dewatered by gravity and the green board is further dewatered by means of vacuum suction. In the process of the disclosure, the dewatering process further includes the application of hot air. The dewatered green board is then dried in a heated oven or kiln to remove residual moisture and form dried base mats. Panels of acceptable size, appearance and acoustic properties are obtained by finishing the dried base mat. Finishing includes surface grinding, cutting, perforation, fissuring, roll/spray coating, edge cutting and/or laminating the panel onto a scrim or screen.

To provide lab-scale samples, the aqueous slurry of the dilute aqueous dispersion of the green board composition can be provided to a Tappi former. The green board slurry is dewatered by gravity followed by vacuum suction. In the process of the disclosure, the dewatering process further includes the application of hot air. The dewatered green board is then dried in the heated oven or kiln to provide a dried lab-scale base mat.

The disclosure provides a method of forming an acoustical panel base mat, including providing a green board comprising a surfactant, and dewatering the green board to form a dewatered green board, wherein the dewatering comprises supplying hot air and applying a vacuum to the green board.

The hot air can be supplied in any suitable manner, for example, placing a heat source above the foraminous wire of a Fourdrinier-type mat forming machine or Tappi former. The hot air may be supplied at a temperature in a range of about 250° F. (about 120° C.) to about 500° F. (about 260° C.) or about 350° F. (about 177° C.) to about 400° F. (about 204° C.), for example, about 250° F., 300° F., 350° F., 400° F., 450° F., or about 500° F. The temperature of the hot air is not particularly limited, however, the temperature of the hot air should be below the melting temperature of the foraminous wire of the Fourdrinier-type mat forming machine.

In embodiments, the application of a vacuum to the green board comprises a first vacuum step and a second vacuum step. Optionally, a pressing step may be provided between the first vacuum step and second vacuum step. The green board may be pressed to achieve a desired thickness. Suitably, the thickness of the green board may be in a range of about 0.50 inches (about 1.3 cm) to about 0.75 inches (about 1.9 cm), about 0.60 inches (about 1.5 cm) to about 0.70 inches (about 1.8 cm), for example, about 0.55 inches, about 0.60 inches, about 0.65 inches, about 0.70 inches, or about 0.75 inches. In embodiments, the green board may have a solids content of about 22 wt % to about 28 wt % after pressing. In embodiments, the green board may have a solids content of about 25 wt % to about 40 wt %, or about 28 wt % to about 38 wt % after the second vacuum step.

The hot air can be supplied prior to or concurrently with the vacuum. In embodiments, the hot air is supplied concurrently with application of the vacuum. In embodiments comprising two vacuum steps, the hot air may be supplied concurrently with the application of the vacuum in both the vacuum steps. In embodiments comprising two vacuum steps, the hot air may be supplied concurrently with the application of the vacuum in at least the second vacuum step.

A vacuum of about 3 inches of mercury (inHg) to about 15 inHg may be applied to the green board. In embodiments, a first vacuum of about 3 inHg (about 0.10 bar) to about 7 inHg (about 0.23 bar), or about 4 inHg (about 0.13 bar) to about 6 inHg (about 0.20 bar), for example, about 3 inHg, about 4 inHg, about 5 inHg, about 6 inHg, or about 7 inHg may be applied followed by a second, higher, vacuum of about 5 inHg (about 0.17 bar) to about 15 inHg (about 0.51 bar), about 6 inHg to about 14 inHg (about 0.47), about 7 inHg to about 13 inHg (about 0.44 bar), about 8 inHg (about 0.27 bar) to about 12 inHg (about 0.41 bar), or about 9 inHg (about 0.30 bar) to about 11 inHg (about 0.37 bar), for example, about 5 inHg, about 6 inHg, about 7 inHg, about 8 inHg, about 9 inHg, about 10 inHg, about 11 inHg, about 12 inHg, about 13 inHg, about 14 inHg, or about 15 inHg.

In embodiments, the dewatering achieves a reduction in water of at least about 5%, at least about 6%, at least about 10%, at least about 15%, at least about 20%, at least about 25%, or at least about 30%, for example, in a range of about 5% to about 30%, or about 6% to about 25%, as compared to an equivalent base mat formed by dewatering a green board under ambient conditions with no surfactant or hot air included. The percent water reduction can be determined by comparing the difference in the water loads of the dewatered green boards.

Drying

The methods of the disclosure may further comprise a drying step. The dewatered green board may be dried in a heated oven or kiln. The drying step is generally the most time consuming and costly step of base mat production. As the dewatered green boards may take hours to dry in the oven or kiln, the amount of base mats produced is limited by how many base mats can be dried. Accordingly, the more water that can be removed during the dewatering step, the less time the green boards will need in the oven to dry, the less costly the base mats will be to produce, and the number of base mats produced can advantageously be increased.

The dewatered green board may be dried at any suitable temperature. In embodiments, the dewatered green board may be dried at a temperature of about 300° F. (about 150° C.) to about 600° F. (about 315° C.), about 400° F. (about 205° C.) to about 600° F., or about 450° F. (about 230° C.) to about 550° F. (about 290° C.), for example, about 300° F., about 250° F., about 400° F., about 450° F., about 500° F., about 550° F., or about 600° F.

As noted above, the dried base mats of the disclosure demonstrate a reduction in the MOR values no greater than 10% of the MOR values of an equivalent base mat formed from green board to which no surfactant was added.

Determination of Water Load

The water load of the green board refers to the pounds of water in 1000 square feet of green board, expressed in lbs/MSF. To determine the water load, the weight of a green board having a size of about 1.5 ft$^2$ was determined using a scale. The water load of a corresponding green board having an area of 1000 square feet is then calculated, and the resulting water load reported in lbs/MSF.

Determination of Mor Value and Hardness Value

The MOR and Hardness values are determined according to ASTM C367 using an Instron machine, or equivalent. Briefly, test specimen are about 3" wide and 10" long. The supporting surface span is about 8". The load was applied at the center of the specimen at a crosshead speed of about 1.97 in/min until a failure occurred. The Modulus of Rupture is calculated according to the equation:

$$MOR=3PL/(2bd^2)$$

wherein P is the maximum load in lbf, L is the length of span in inches, b is the specimen width in inches, and d is the specimen thickness in inches.

Determination of Solid Content

The solid content of the dewatered green board is calculated as follows:

Solid content=(weight of dried green board/weight of green board after dewatering)×100

The weight of the green board prior to vacuum dewatering and after vacuum dewatering was determined using a scale having a precision of at least 0.1 g.

The compositions, panels, and methods in accordance with the disclosure can be better understood in light of the following examples, which are merely intended to illustrate the panels and methods of the disclosure and are not meant to limit the scope thereof in any way.

EXAMPLES

Example 1

Ceiling tiles were formed using a wet forming process from 20 wt % mineral wool, 14 wt % recycled newsprint fiber, 58 wt % expanded perlite and 8 wt % unmodified corn starch, based on the total weight of the solid materials. The materials were mixed in water to provide a slurry which was dewatered using a Tappi former to form a green board. The green board was dewatered by vacuuming using the Tappi former, pressed using a hydrolic press, without the application of vacuum, to approximately 0.65 inches (about 1.67 cm), and further dewatered by vacuuming a second time using the Tappi former. In trials where surfactant was included, about 0.40 wt % neat surfactant, based on the total weight of the dry solids of the base mat, applied as a 30 wt % surfactant solution, of an alkyl ether sulfate anionic surfactant of the disclosure (Hyonic® 25AS from GEO Specialty Chemicals) was included in the slurry prior to forming of the Tappi board. In trials where hot air was used concurrently with the vacuum, an oven heated to 500° F. (about 260° C.) was used as a heat source and the hot air was drawn from the oven to the Tappi former through an insulated flexible hose and a cap place on top of the Tappi former. The temperature of the hot air going into the Tappi former was measured to be about 385° F. (about 196° C.). In trials where hot air was not used, the oven was not connected to the Tappi former and ambient temperature air ("cold air") was used. After the second vacuuming, the dewatered green board was placed into an oven at about 500° F. (about 260° C.) for 1 hour and then 300° F. (about 150° C.) for 4 hours to form a dried base mat.

Table 1, below, describes the dewatering conditions and whether a surfactant was included in the slurry composition. Each set of conditions was tested in at least triplicate and the average values for the solid content of the dewatered green board (i.e., after the 2$^{nd}$ vacuuming step), the water load of the dewatered green board, the water reduction of the green board from the dewatering process according to the disclosure relative to an equivalent control board not including a surfactant and dewatered without the use of hot air, and the density, MOR value, modulus of elasticity (MOE) value, and Hardness value of the base mat that results after drying the dewatered green board in the oven for 1 hour are provided below.

TABLE 1

| Description | A Control: no surfactant, cold air with vacuum | B No surfactant, hot air with vacuum | C Surfactant, cold air with vacuum | D Surfactant, hot air with vacuum |
| --- | --- | --- | --- | --- |
| Solid content of dewatered green board (%) | 28.93 | 29.09 | 30.14 | 34.06 |
| Water load of dewatered green board (lbs/MSF) | 1453 | 1438 | 1365 | 1140 |
| Water reduction relative to control (%) | — | 1.02 | 6.04 | 21.57 |
| Thickness (inches) | 0.64 | 0.64 | 0.65 | 0.64 |
| Density of base mat (lbs/ft$^3$) | 11.10 | 11.07 | 10.88 | 11.05 |
| MOR of base mat (psi) | 89.11 | 87.70 | 80.40 | 93.72 |
| MOE of base mat (psi) | 11887 | 11647 | 10252 | 11318 |
| Hardness of base mat (psi) | 83.86 | 83.78 | 78.80 | 85.90 |

As shown in Table 1, green boards that were either heated during vacuum dewatering only (condition B) or included an alkyl ether sulfate surfactant of the disclosure only (condition C) demonstrated improved water reduction during the dewatering process relative to the green boards that were not heated and did not include surfactant (control A), showing an increase in water reduction of about 1% and 6%, respectively. Further, green boards that were both heated during vacuum dewatering and included an alkyl ether sulfate surfactant of the disclosure (condition D), demonstrated significant water reduction, about 22%, relative to the control green boards, and showed significantly increased water reduction over the reduction in water demonstrated by the hot-air only (condition B, about 21%) or surfactant only (condition C, about 16%) green boards.

Table 1 further demonstrates that the resulting dried base mats that were dewatered according to conditions B, C, and D demonstrated little to no strength loss relative to the control base mat, A. In particular, the strength as characterized by the MOR values for the base mats dewatered according to conditions B, C, and D (MOR: 87.7, 80.4, 93.72 psi, respectively) are not significantly decreased relative to the control A (MOR: 89.11 psi).

Thus, Example 1 demonstrates green boards dewatered according to the disclosure demonstrate reduced water content relative to green boards dewatered according to conventional industry processes and, further, that the base mats resulting from green boards dewatered according to the disclosure demonstrate at least comparable strength relative to base mats resulting from green boards dewatered according to conventional industry processes.

Example 2

Ceiling tiles were formed using a wet forming process from 20 wt % mineral wool, 12 wt % recycled newsprint fiber, 60 wt % expanded perlite and 8 wt % unmodified corn starch, based on the total weight of the solid materials. The materials were mixed in water to provide a slurry which was dewatered using a Tappi former to form a green board. The green board was dewatered by vacuuming using the Tappi former, pressed using a hydrolic press, without the application of vacuum, to approximately 0.65 inches (about 1.67 cm), and further dewatered by vacuuming a second time using the Tappi former. In trials where surfactant was included, about 0.27 wt %, based on the total weight of solids, of an anionic alkyl ether sulfate ammonium salt surfactant according to the disclosure (Hyonic 25AS from GEO Specialty Chemicals) or a nonionic aliphatic polyoxyethylene ether surfactant not according to the disclosure (Hydropalat WE 3322 from BASF) was included in the slurry prior to forming of the Tappi board. In trials where hot air was used concurrently with the vacuum, an oven heated to 500° F. (about 260° C.) was used as a heat source and the hot air was drawn from the oven to the Tappi former through pipe, insulated flexible hose and a cap being placed on top of the Tappi former. The temperature of the hot air going into the Tappi former was measured to be 385° F. (about 196° C.). In trials where hot air was not used, the oven was not connected with the Tappi former and ambient temperature air ("cold air") was used. After the second vacuuming, the dewatered green board was placed into an oven at about 500° F. (about 260° C.) for 1 hour and then 300° F. (about 150° C.) for 4 hours to form a dried base mat.

Table 2, below, describes the dewatering conditions and whether a surfactant was included in the slurry composition. The average solid content of the dewatered green board (i.e., after the $2^{nd}$ vacuuming step), the water load of the dewatered green board, the water reduction of the green board from the dewatering process according to the disclosure relative to an equivalent control board not including a surfactant and dewatered without the use of hot air, and the density, MOR value, modulus of elasticity (MOE) value, and Hardness value of the base mat that results after drying the dewatered green board in the oven are provided below.

TABLE 2

| Description | E Control: no surfactant, cold air with vacuum | F Hyonic 25 AS surfactant, hot air with vacuum | G Hydropalat WE 3322 surfactant, hot air with vacuum |
| --- | --- | --- | --- |
| Solid content of dewatered green board (%) | 32.85 | 36.73 | 36.08 |
| Water load of dewatered green board (lbs/MSF) | 1223 | 1033 | 1035 |
| Water reduction relative to control (%) | — | 15.57 | 15.39 |
| Thickness (inches) | 0.60 | 0.60 | 0.60 |
| Density of base mat (lbs/ft$^3$) | 12.27 | 12.36 | 11.94 |
| MOR of base mat (psi) | 83.6 | 87.8 | 62.2 |
| MOE of base mat (psi) | 10620.5 | 11596.2 | 7514.7 |
| Hardness of base mat (psi) | 98.3 | 116.6 | 103.6 |

As shown in Table 2, green boards that were both heated during vacuum dewatering and included surfactant (condition F and G) demonstrated improved water reduction during the dewatering process relative to the green boards that were not heated and did not include surfactant (control E).

Table 1 further demonstrates that the resulting dried base mats that included the use of a alkyl ether sulfate surfactant of the disclosure (condition F) demonstrated little to no loss in MOR relative to the control base mat, E. However, when nonionic aliphatic polyoxyethylene ether surfactant, not of the disclosure, was included (condition G), the MOR of the base mat was reduced about 25%, from 83.6 psi to 62.2 psi.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of a conflict between the present disclosure and incorporated patents, publications, and references, the present disclosure should control.

What is claimed:

1. A method of forming an acoustical panel base mat, comprising:
    providing a green board comprising an alkyl ether sulfate surfactant, wherein the green board comprises from about 10 to about 40 wt % solids; and
    dewatering the green board to form a dewatered green board, wherein the dewatering comprises supplying hot air and applying a vacuum to the green board.
2. The method of claim 1, wherein the hot air is supplied and the vacuum is applied to the green board concurrently.

3. The method of claim 1, wherein the surfactant is provided in an amount in a range of about 0.10 wt % to about 3.0 wt %, based on the total weight of the solids.

4. The method of claim 1, wherein the surfactant is provided in an amount in a range of about 0.10 wt % to about 0.5 wt %, based on the total weight of the solids.

5. The method of claim 1, wherein the green board further comprises a mineral wool, a cellulose, a mineral aggregate, and a starch.

6. The method of claim 5, wherein the mineral aggregate is selected from the group consisting of perlite, vermiculite, clay, and combinations thereof.

7. The method of claim 5, wherein the cellulose is provided by newspaper.

8. The method of claim 1, wherein dewatering further comprises a pressing step.

9. The method of claim 8, wherein the green board comprises about 22 wt % to about 28 wt % solids after pressing.

10. The method of claim 1, wherein applying a vacuum to the green board comprises a first step of applying a vacuum and a second step of applying a vacuum.

11. The method of claim 10, wherein hot air is supplied concurrently with applying the vacuum in both steps of applying a vacuum.

12. The method of claim 10, wherein hot air is supplied concurrently with at least the second step of applying a vacuum.

13. The method of claim 1, wherein the hot air has a temperature in a range of about 250° F. (about 120° C.) to about 500° F. (about 260° C.).

14. The method of claim 1, wherein the hot air has a temperature in a range of about 350° F. (about 177° C.) to about 400° F. (about 204° C.).

15. The method of claim 1, further comprising a drying step after dewatering to provide a dried base mat.

16. The method of claim 15, wherein the dewatered green board is dried at a temperature of about 300° F. (about 150° C.) to about 600° F. (about 316° C.).

17. The method of claim 1, wherein dewatering achieves a reduction in water of at least about 5% compared to an equivalent base mat formed by dewatering a green board under ambient conditions with no surfactant included.

18. The method of claim 15, wherein the dried base mat demonstrates a reduction in modulus of rupture (MOR) value of no greater than 10% compared to an equivalent base mat with no surfactant included.

* * * * *